Figure 4:
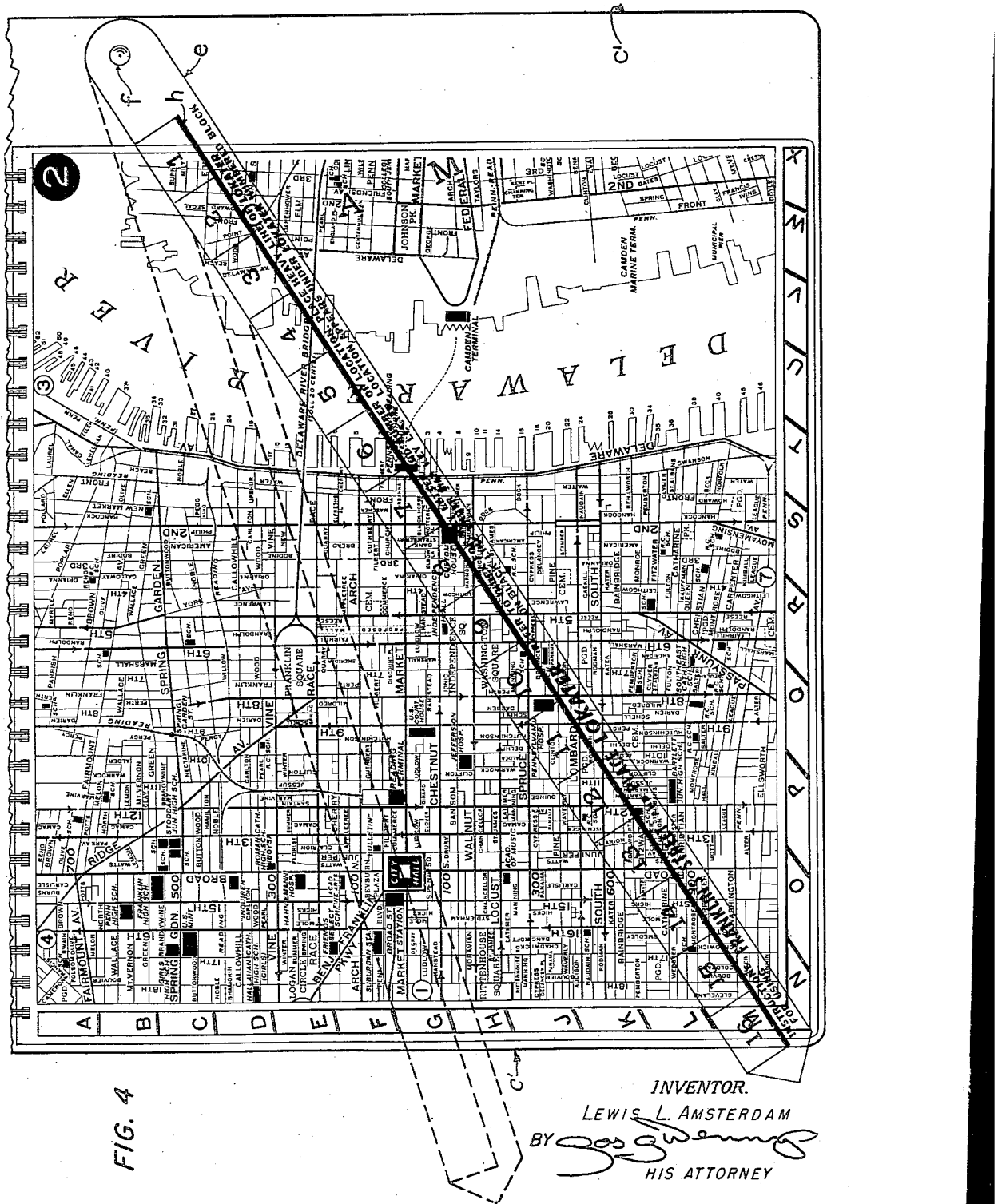

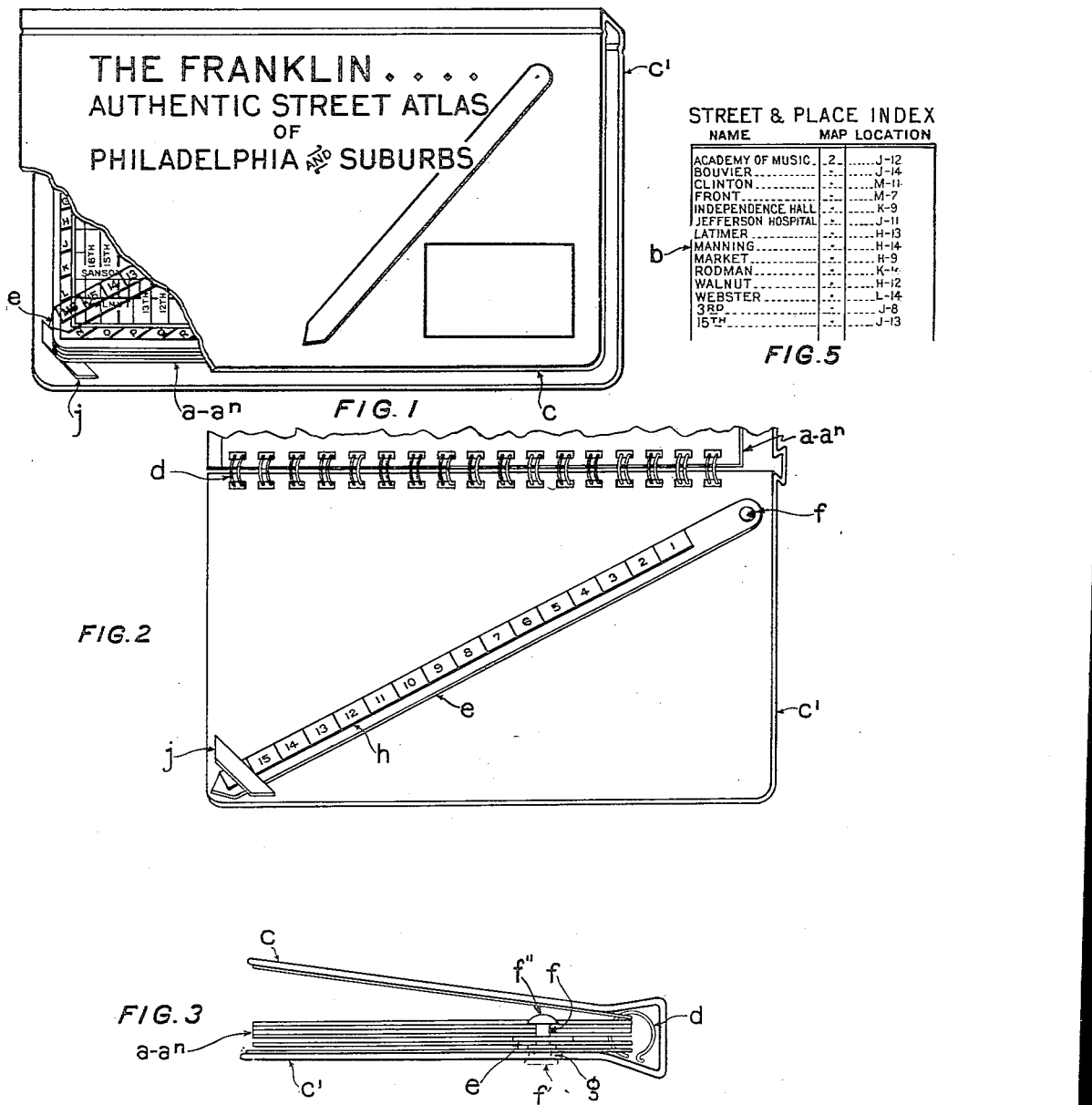

INVENTOR.
LEWIS L. AMSTERDAM
BY
HIS ATTORNEY

United States Patent Office 2,809,447
Patented Oct. 15, 1957

2,809,447
ATLAS
Lewis L. Amsterdam, Philadelphia, Pa.
Application March 12, 1954, Serial No. 415,866
2 Claims. (Cl. 35—42)

My invention is an atlas having means for quickly and accurately locating areas and landmarks such as buildings, parks, rivers and other objects.

My invention is preferably embodied in an atlas having one or more maps hingedly connected with a cover including a back board and preferably a front board. Each map is preferably so positioned that its northerly border parallels the hinge line and its easterly border parallels the dextral edge of the back board.

A long narrow strip of material is pivotally connected with the back board adjacent to a corner thereof, and preferably adjacent to the corner formed by the juncture of the top (inner) edge and the dextral edge of the back board. This pivoted strip forms a ruler oscillatable across the face of any of the maps in the atlas.

The ruler is subdivided along its length to form transparent windows each bounded along its top by a straight edge of the ruler, bounded along its bottom by a locator line parallel with the straight edge, and bounded laterally by parallel lines normal to the straight edge and line parallel thereto. Each window is identifiable by means of individual indicia indicating its position relative to the axis of the pivoted ruler.

Each map in the atlas has portions of its perimeter farthest from the axis of oscillation of the ruler, viz. the sinistral and lower edges thereof, divided into small stretches or blocks bounded by diagonal lines spaced from one another a distance equal to the distance between the straight edge and the locator line parallel thereto on the ruler. Such perimetral diagonal lines are so inclined that the locator line (which bounds the bottom of the windows) may be brought into registration with any perimetral diagonal line by turning the ruler on its pivot. Each perimetral block between diagonal lines is marked with an individual identifying indicia so that any particular block and the diagonal line along the lower or sinistral boundary thereof may be readily identified and located.

When registration is effected of the locator line with a perimetral diagonal line of the map the indicia above or to the left of such line will be visible through an outer window of the ruler to identify the series of map areas visible through the windows between such perimetral indicia and the axis of the ruler. By moving the locator line sequentially from one perimetral diagonal line to another all along the sinstral and lower edge of the map, the entire area of the latter may be sequentially brought under identifiable transparent windows and segregated thereby into such small area as to permit rapid scanning of the area visible therethrough and the location of landmarks therein.

The principles of my invention and the best form in which I have contemplated embodying such principles will further appear from the following description and the accompanying drawings in illustration thereof.

In the drawings, Fig. 1 is a broken perspective view of my improved atlas in the closed position with all the maps turned downward; Fig. 2 is a fragmentary view of my improved atlas in the open position with all the maps turned upward; Fig. 3 is a dextral end view of the atlas shown in Fig. 1 with the front cover partly lifted; Fig. 4 is an enlarged fragmentary view of my improved atlas opened to show a map with the ruler in indicating position, and Fig. 5 is a fragmentary view of a portion of an index sheet of the atlas by which the position of a ruler window and the position of the locator line of the ruler with perimetral lines of a map may be correlated to signify the location of a particular area or object.

As illustrated in the drawings, my invention is embodied in an atlas comprising a series of map leaves $a$—$a^n$ and an index leaf $b$ fastened together and to a cover $c$ by a binder $d$, such as a coiled wire permitting the cover, map leaves and index leaf to lie substantially flat when opened.

A ruler $e$ is pivotally connected with the back board $c'$ of the cover $c$ by a stud $f$ adjacent to the upper dextral corner of the map leaves $a$—$a^n$.

The stud preferably comprises a headed member $f'$ seated in a ferrule $g$ fixed in the back board $c'$ and coupled to a second headed member $f''$ which has a shank projecting above the inner surface of the back board $c'$ a distance approximating the thickness of the map leaves when the atlas is in closed position.

The ruler $e$ consists of a transparent, flexible, narrow strip of plastic having a length approximating that of a diagonal across a map leaf from the upper dextral corner to the lower sinistral corner thereof.

A locator line $h$ on the ruler $e$ extends longitudinally thereof and parallel with the upper straight edge thereof. The area of the ruler strip between such locator line and the upper straight edge is divided into numbered, transparent locating windows 1—16, each extending but a relatively short distance along the ruler $e$ and bounded laterally by parallel lines normal to the straight edge and to the locator line.

A keeper $j$ is fixed diagonally across the lower sinistral corner of the back board $c'$ and preferably consists of a strap of sufficient flexibility to permit ready insertion and retraction of the tapered outer end of the flexible ruler $e$ when the latter is not in use.

The sinistral and lower perimetral edges of each of the maps on the sheets $a$—$a^n$ are divided into short blocks by diagonal guide lines each lying adjacent to an index letter A—W. These guide lines are substantially radial to the center of oscillation of the ruler $e$ on the stud $f$ so that the locator line $h$ may be readily and accurately registered therewith. The diagonal lines A—W are spaced from one another a distance equal to the vertical distance between the locator line $h$ and upper straight edge of the ruler $e$.

When the locator line $h$ of the ruler $e$ is registered with a perimetral line the proximate index letter A—W will show through an outer window of the ruler and each window 1—16 overlying the map will delineate and define a small area of the map. Each such area may be identified and indexed by correlating the number, or other identifying indicia, of a particular window and the letter, or other identifying indicia, of a particular perimetral diagonal line of the map with which the locator line $h$ of the ruler $e$ registers when the window overlies the particular area.

The streets, institutions or other landmarks on any map or an entire set of maps may be listed in alphabetical or numerical order on one or more index sheets $b$ of the atlas. The map number, perimetral line letter and window number of the area containing all or a part of each street, institution or landmark is listed adjacent thereto as indicated in Fig. 5. An index is thus provided by which any listed street, institution, or other landmarks may be located by laying the ruler $e$ on the designated map with its locator line h in registration with a designated perimetral divider along the map edge and then examining the map area beneath the designated window.

My invention permits the entire area of each map to be brought into view in small sections through the respective windows by moving the locator line of the ruler successively into registration with the respective diagonal lines A—W along the sinistral and lower sides of the map, and each such area is definitely outlined by the boundaries of the window covering it.

Having described my invention, I claim:

1. An atlas comprising a cover, a map connected with and movable relatively to said cover, a ruler, a pivot pivotally connecting said ruler to said cover independently of said map and beyond the boundary of said map, said ruler being oscillatable across said map, said ruler having transparent sections forming windows with narrow boundaries between them and having a locator line along an edge of each of said windows and indicia identifying the respective windows, said map having spaced perimetral lines and indicia therefor, said map indicia and window indicia being complementary to one another when said locator line registers with a perimetral line to identify map areas covered by the respective windows, and the entire area of the map being visible through said windows by registering said locator line with the successive perimetral lines.

2. An atlas comprising a cover including a back board, a transparent ruler pivotally connected with said back board and oscillatable about an axis of oscillation adjacent to a corner of said board and having a locator line thereon radiating from such axis, a keeper connected with said back board adjacent to a corner thereof diagonally across from said first named corner, said keeper being adapted for receiving and retaining the free end of said ruler, and a set of maps hinged to said back board with their upper dextral corners adjacent to said axis of oscillation of said ruler and the pivotal connection of said ruler with said back board including a stud having a shank surrounding said axis of oscillation and extending above said back board a distance approximating the thickness of said set of maps, said maps each having successive, spaced indicia along two sides of the perimeter thereof as an index for said locator line, said ruler having indicia for locating points therealong and being movable about and axially along the axis of said stud and being oscillatable over said maps one by one to bring the entire area of each map into view in sections through said ruler when said locator line is brought successively into cooperating relation with said map indicia.

References Cited in the file of this patent

UNITED STATES PATENTS

| 332,167 | Schild | Dec. 8, 1885 |
| 1,054,890 | Alliot | Mar. 4, 1913 |
| 1,110,901 | Cowles | Sept. 15, 1914 |
| 1,510,110 | Schmidt | Sept. 30, 1924 |
| 2,242,735 | Widess | May 20, 1941 |

FOREIGN PATENTS

| 619,074 | Great Britain | Mar. 3, 1949 |